United States Patent [19]

Busch et al.

[11] 3,934,044

[45] Jan. 20, 1976

[54] REDUCING LEVELS OF SURFACE CONTAMINATION ON MEAT

[75] Inventors: Wayne A. Busch, Allison, Iowa; Robert E. Taylor, Glenview; Robert B. Tompkin, La Grange, both of Ill.

[73] Assignee: Swift and Company Limited, Chicago, Ill.

[22] Filed: Dec. 6, 1974

[21] Appl. No.: 530,177

[52] U.S. Cl. ............... 426/326; 426/327; 426/332; 426/335
[51] Int. Cl.$^2$ ............................................ A23L 1/31
[58] Field of Search .......... 426/331, 332, 335, 326, 426/327, 262, 263, 264, 265, 266

[56] References Cited
UNITED STATES PATENTS

| | | | |
|---|---|---|---|
| 1,032,885 | 7/1912 | Dahle | 426/332 |
| 2,383,907 | 8/1945 | Beelhem et al. | 426/331 |
| 3,220,854 | 11/1965 | Zwart | 426/264 |

*Primary Examiner*—Hyman Lord
*Attorney, Agent, or Firm*—Edward T. McCabe; Charles E. Bouton; Robert E. Blankenbaker

[57] ABSTRACT

A process for treating meat and meat-cuts to destroy surface bacteria, and particularly spoilage bacteria, comprising contacting meat surfaces with a hot aqueous acid solution for a time sufficient to achieve substantial surface bacterial kill but insufficient to result in any appreciable organoleptic deterioration or protein denaturation of the meat.

10 Claims, No Drawings

REDUCING LEVELS OF SURFACE CONTAMINATION ON MEAT

This invention relates to the treatment of food products to destroy vegetative microorganisms contained thereon. More particularly, this invention relates to a process for destroying psychrotrophic surface bacteria carried by fresh or cooked meat and meat-cuts.

In the slaughtering and distribution of meat, whole animal carcasses are "broken-down" to smaller portions or cuts until consumer-size cuts are provided at the retail level. Usually, the whole carcass is first broken into half carcass or quarter carcass portions, and is then subsequently reduced to primal cuts. Finally, the primal cuts are reduced to sub-primal cuts, and then to retail cuts which are sold to the consumer. The operation of breaking-down whole carcasses usually takes place at two or more points along the meat distribution chain. For example, whole carcasses may be broken-down to half or quarter carcasses by the packer at the point of animal slaughter. Thereafter, these half or quarter carcasses, or even whole carcasses, may be further broken-down into primal cuts, sub-primal cuts, and retail cuts by wholesalers, distributors, and/or retailers such as butchers and supermarkets. As used in the description of the present invention, the term "meat-cuts" will be used to designate all sub-portions of a whole carcass, including but not limited to half carcasses, quarter carcasses, primal cuts, sub-primal cuts and retail cuts.

Because of the extensive handling and time involved in breaking-down whole carcasses and sub-portions thereof, along with shipment, storage and distribution of these meat-cuts, individual cuts of meat become contaminated with bacterial flora. Similarly, cooked meat products such as table-ready meats become contaminated with surface bacterial flora through handling in the processing plant. Primarily, this surface flora comprises psychrotrophic spoilage bacteria, such as the genus Pseudomonas. Shelf-life of meat is a direct function of the level of bacterial contamination, and more particularly, the level of psychrotrophic bacterial contamination. That is, meat or meat-cuts possessing a high initial level of psychrotrophic bacterial contamination exhibit an extremely short shelf-life, whereas, meat or meat-cuts exhibiting a very low initial level of psychrotrophic bacterial contamination exhibit an extended shelf-life.

Spoilage bacteria, such as Pseudomonads, are psychrotrophic bacteria in that, while their growth is most rapid at approximately room temperatures, they also continue to grow, albeit at slower rates, at refrigerated temperatures. This explains why the mere act of refrigeration of meat-cuts during transportation and storage is not effective in preventing growth of spoilage bacterial flora on the surfaces thereof.

Many techniques have been employed in the past in the treatment of meat and meat-cuts to destroy surface bacterial flora. For example, meat has been treated with acid, steam, chlorine solutions, and combinations thereof. All of these techniques have suffered from one or more of the following problems: (1) denaturation of meat protein, (2) insufficient bacterial kill, (3) deleterious color change, (4) unacceptable flavor modification, and (5) inadequate control of the process in large-scale operations. Another prior art technique of treating food products to destroy surface bacteria is set forth in U.S. Pat. No. 2,383,907 to Beechem, et al. This patent describes a method of destroying sporogenic bacteria (spore formers) contained on food products such as vegetables, spices, legumes, cereal grains and meats. The process described comprises contacting the food products with an aqueous acid solution having an acid concentration of up to 10%, and preferably 8–10%, at temperatures not higher than 135°F. (57°C.), for from 1–2 minutes. When this method is used to treat meat or meat-cuts, it results in product exhibiting unacceptable color change, protein denaturation and off-flavors. The surface meat protein is substantially denatured, and the surfaces of the meat assume unattractive shades of brown, grays and blacks. Moreover, the meat possesses an unacceptable acidic, sour taste. Also, the product exhibits an unpalatable, sour aroma. Although the Beechem process does result in an excellent bacterial kill, the meat product obtained is unmarketable.

It is therefore a primary objective of the present invention to provide an improved process for destroying microorganisms, including species of the genus Pseudomonas and other psychrotrophs, carried by meat surfaces.

It is also an objective of the present invention to provide an improved process for destroying psychrotrophic spoilage bacteria on meat or meat-cuts without substantially denaturing meat protein and without adversely affecting the color, flavor or aroma of the meat.

It is another objective of the present invention to provide an improved process for destroying psychrotrophic bacteria carried by meat-cut surfaces without causing organoleptic deterioration of the meat-cuts.

Briefly, the objectives of this invention are carried out by application of a hot, dilute acid solution to meat surfaces for a relatively brief period of time. The process is particularly applicable to the treatment of all fresh meat products including beef, pork, lamb, veal and poultry. The process is also applicable to the treatment of cooked meat products such as table-ready meats. Although the process is applicable to the treatment of whole, half and quarter carcasses, as well as table-ready meats (cooked), it has primary application to the treatment of primal cuts, sub-primal cuts and retail cuts of meat.

All food grade acids have some beneficial effect in reducing bacterial contamination on meat surfaces, including acetic acid, citric acid, tartaric acid, fumaric acid, ascorbic acid, malic acid, succinic acid, adipic acid, and phosphoric acid. However, we have unexpectedly discovered that the use of acetic acid obtains a bacterial reduction far greater than that obtained by any other food grade acid, using comparable application parameters, and therefore, this invention is directed to the use of acetic acid.

The aqueous acetic acid solution used to contact the meat surfaces should have an acid concentration of from about 1% to about 2.5%. Acetic acid concentrations of less than about 1% provide insufficient bacterial kill, and acetic acid concentrations of greater than about 2.5% tend to impart an unpalatable taste, color and aroma to the meat. The aqueous acetic acid solution should be maintained at a temperature of from about 140°F. (60°C.) to about 180°F. (82°C.), and preferably from about 150°F. (66°C.) to about 170°F. (77°C.). Temperatures in excess of about 180°F. (82°C.) cause denaturation of surface meat protein and meat discoloration, whereas temperatures of less than about 140°F. (60°C.), when used with the acid concentrations and brief contact times of this process, do not consistently achieve adequate surface bacterial kill. The length of time of acetic acid solution contact with the meat surfaces should be sufficient to achieve substantial kill of surface bacterial flora, but insufficient to cause appreciable denaturation of meat protein or organoleptic deterioration. It has been determined that this can be achieved by contacting the meat surfaces with a 1-2.5% acetic acid solution at 140°-180°F. (60°C. - 82°C.) for a time period of from about 5 to 60 seconds and preferably from about 5 to 30 seconds. Contact times of less than about 5 seconds do not achieve sufficient bacterial kill, whereas contact times in excess of 60 seconds tend to promote unpalatable taste, aroma and color. It will, of course, be understood that meat denaturation and surface discoloration are usually not problems when treating cooked meat items such as table-ready meats.

It is important that application of the hot acetic acid solution result in contact of all surfaces of the meat or meat-cut. Preferably this is achieved by the use of a spray system, although other techniques such as dipping may be utilized. For example, a chamber or cabinet can be provided containing a plurality of jet spray nozzles arranged so as to insure contact of all surfaces of a carcass or a meat-cut with hot acetic acid spray. Nozzle size, acid flow rate and spray pressures are best determined by the skilled practitioner in light of the requirements of a particular system. We have obtained excellent results employing 0.025 inch (0.06 cm.) orifice nozzles operating at pressures of from about 1.75 to 3.50 kg./cm² (25–50 psig). Larger bodies of meat such as whole carcasses, half carcasses, quarter carcasses, or primal cuts can be suspended from hooks carried by an endless conveyor, and thus carried along a defined path through the spraying chamber ar a preselected speed to achieve a 5–60 second spray. Also, smaller meat-cuts such as sub-primal cuts, retail cuts and table-ready meat items can be automatically processed through the spray chamber while carried by an endless wire mesh conveyor. The chamber, spray nozzles and conveyor are preferably made from stainless steel.

When the meat or meat-cuts are treated within a closed chamber, it has been found desirable to maintain the temperature therein at elevated levels comparable to the acetic acid temperature. Thus the chamber temperature should be maintained at from about 140°F. (60°C.) to about 180°F. (82°C.) during treatment. This is most easily achieved by automatically controlling chamber temperature with a built-in electrical heater, or by metering live steam into the chamber at appropriate time intervals. The elevated temperature within the chamber aids in bacterial destruction, as well as acting to prevent rapid temperature drop of the hot acetic acid solution upon spraying.

Considering the acid concentrations, temperatures and spray times set forth heretofore, it should be noted that the optimum parameters for any particular operation is best determined by trial and error experimentation in order to balance the competing demands of bacterial kill and product palatability. For example, it has been determined that for most types and sizes of meat-cuts a very acceptable product exhibiting greater than about a 75% initial surface bacteria kill can be obtained by treating meat-cuts with 1-½% acetic acid at 160°F. (71.5°C.) for about 10 seconds in a spray chamber. If retention time in the spray chamber were to be decreased to 5 seconds, then acid concentration and/or temperature would normally be increased. Conversely, if contact time were to be increased, then acid concentration and/or temperature would normally be decreased.

As rough guidelines, we have determined that for most fresh meat or meat-cuts, aqueous acetic acid solutions at 140°F. (60°C.) can be applied at 1% strength for up to about 60 seconds without incurring any color or flavor problems, and can be applied at 2.5% strength for up to about 30 seconds without developing any color or flavor problems. Also, aqueous acetic acid solutions at 160°F. (71.5°C.) can be applied at 1% strength for up to about 60 seconds and at 2.5% strength for up to about 30 seconds, without generating any flavor or color problems. Likewise, aqueous acetic acid solutions at 180°F. (82°C.) can be applied at 1% strength for up to about 30 seconds and at 2.5% strength for up to about 10 seconds, without resulting in flavor or color problems that would render the meat-cuts unpalatable. Generally, these time/temperature relationships are less critical for low red pigment-bearing meats such as poultry, thus enabling greater latitude in controlling process parameters. Also, these time/temperature relationships are even less critical when the process is used to treat cooked meats such as table-ready meat products.

After treatment by this inventive process, the meat or meat-cuts should be stored at refrigerated temperatures of from about 30°F. to 40°F. (−1°C. to 4°C.). The smaller cuts, such as sub-primal cuts and retail cuts, should first be packaged and sealed in suitable film prior to refrigeration, preferably in low oxygen permeability film, such as saran, polyethylene or cryovac bags. Also, it is often desirable to vacuum package the meat-cuts in low oxygen permeability films. Vacuumized packages could also be backfilled with a gas, such as nitrogen. It has been observed that the refrigerated shelf-life of meat and meat-cuts treated in accordance with this invention is greatly extended as compared to shelf-life of non-treated, control samples.

EXAMPLE I

Beef ribs were sawed into equal sub-primal cuts. Initial bacteriological counts were taken and control samples were set aside. The remaining pieces were treated by placing the cuts in a chamber and spraying with 160°F./1.5% acetic acid solution for 10 seconds. Following treatment, bacteriological counts were taken. All pieces (test and control) were then wrapped in cryovac film or saran film, and held at 38°/40°F. for storage evaluation.

TABLE I

| TREATMENT | INITIAL TOTAL AEROBIC COUNT/SQ. INCH |
|---|---|
| Control — (6) | 150 |
| | 850 |
| | 650 |
| | 50 |
| | 100 |
| | 150 |
| IMMEDIATELY AFTER TREATMENT | |
| TREATMENT | TOTAL AEROBIC COUNT/SQ. INCH |
| Test — (6) | 100 |
| | 50 |
| | 50 |
| | 50 |

TABLE I-continued

| TREATMENT | INITIAL TOTAL AEROBIC COUNT/SQ. INCH |
|---|---|
| | 200 |
| | 100 |

TABLE II

| Days Storage at 38/40° | TOTAL AEROBIC COUNT/SQ. INCH | | | |
|---|---|---|---|---|
| | SARAN FILM | | CRYOVAC FILM | |
| | Control | Test | Control | Test |
| 7 | 360,000 | 14,000 | 3,000 | 500 |
| | 130,000 | 28,000 | 4,900,000 | 500 |
| | 800,000 | 270,000 | 36,000 | 500 |
| 14 | 7,500,000,000 | 3,500,000 | 6,900,000 | 500 |
| | 990,000,000 | 3,000 | 130,000 | 8,000 |
| | 1,000,000,000 | 440,000 | 6,500,000 | 210,000 |

The data illustrates initial bacterial reduction, as well as decreased bacterial growth during storage, when the subprimal cuts are treated with 1.5% acetic acid at 160°F. for 10 seconds. The treated product exhibited excellent organoleptic properties.

EXAMPLE II

Beef ribs were cut into one-inch steaks, representing retail cuts. Initial bacteriological counts were taken prior to treatment. Three steaks were individually placed in a chamber and sprayed with 130°F./1.5% acetic acid solution for 10 seconds. Three other steaks were treated with 160°F./1.5% acetic acid solution for 10 seconds; six steaks were untreated (control). After treatment, bacteriological samples were taken.

TABLE III

| TREATMENT | TOTAL AEROBIC COUNT/SQ. INCH |
|---|---|
| CONTROL | 1100 |
| | 500 |
| | 700 |
| | 1800 |
| | 700 |
| | 400 |
| AFTER TREATMENT | |
| 130°F. Spray | 150 |
| | 200 |
| | 200 |
| 160°F. Spray | 100 |
| | 50 |
| | 100 |

TABLE IV

| 8 DAYS STORAGE | TOTAL AEROBIC COUNT/SQ. INCH | | |
|---|---|---|---|
| | CONTROL | 130°F. | 160°F. |
| 38/40° | 8,100,000 | 1,900 | 1,100 |
| | 750,000 | 12,000 | 2,200 |
| | 3,200,000 | 20,000 | 10,000 |

The data shows that a significant bacterial reduction is obtained immediately after treatment, as well as over extended storage, when the meat-cuts are treated with 1.5% acetic acid for 10 seconds at 160°F. Moreover, this bacterial reduction is significantly greater than comparable treatment of meat-cuts with 130°F. acid for 10 seconds.

EXAMPLE III

Fresh lamb legs and loins were treated in a spray chamber with 1.5% acetic acid solution at 160°F. with an application time of 10 seconds. Each piece was treated individually and retail wrapped in cryovac or saran film (sub-primal cuts). Initial counts were taken before any treatment, followed by counts immediately after treatment. After the product was treated and packaged it was stored at 31°F. for up to 28 days.

TABLE V

| | TOTAL AEROBIC COUNT/SQ. INCH |
|---|---|
| Initial Samples | 6500 |
| | 1700 |
| | 4900 |
| | 6400 |
| | 7400 |
| | 8600 |
| After Treatment | 50 |
| | 50 |
| | 50 |

TABLE VI

| STORAGE DAYS AT 31°F. | TOTAL AEROBIC COUNT/SQ. INCH | | | |
|---|---|---|---|---|
| | CRYOVAC FILM | | SARAN FILM | |
| | Control | Test | Control | Test |
| 14 | 2900 | 1500 | 1800 | 500 |
| 21 | 830,000 | 800 | 360,000,000 | 50,000 |
| 28 | 23,000,000 | 9500 | 1,300,000,000 | 500 |

Again, the data illustrates that sub-primal cuts treated with 1.5% acetic acid at 160°F. for 10 seconds exhibit substantial initial reduction of surface bacteria, along with significant reduction of bacterial growth during storage.

EXAMPLE IV

Fresh hams were skinned and boned and cut into knuckle, inside and outside rounds (sub-primal cuts). Initial counts were taken of random samples. Pieces were treated individually using the same procedure as with beef and lamb and using the same acetic acid temperature, concentration and time application. Immediately following treatment bacteriological counts were taken. The product was then retail wrapped in saran film and stored at 31°F.

TABLE VII

| TREATMENT | TOTAL AEROBIC COUNT/SQ. INCH |
|---|---|
| Initial/Outside | 200,000 |
| | 130,000 |
| Initial/Inside | 940,000 |
| | 250,000 |
| Initial/Knuckle | 250,000 |
| | 320,000 |
| After Treatment/Outside | 39,000 |
| After Treatment/Inside | 32,000 |

TABLE VII-continued

| TREATMENT | TOTAL AEROBIC COUNT/SQ. INCH |
|---|---|
| After Treatment/Knuckle | 160,000 |

TABLE VIII

| Storage — 31°F. | TOTAL AEROBIC COUNT/SQ. INCH | |
|---|---|---|
| DAYS | CONTROL | TEST |
| 7 | | |
| Outside | 130,000 | 75,000 |
| Inside | 160,000 | 50,000 |
| Knuckle | 130,000 | 75,000 |
| 14 | | |
| Outside | 31,000,000 | 50,000 |
| Inside | 120,000 | 550,000 |
| Knuckle | 320,000 | 290,000 |
| 21 | | |
| Outside | 6,400,000 | 120,000 |
| Inside | 1,800,000 | 130,000 |
| Knuckle | 4,600,000 | 150,000 |

The data substantiates the findings set forth in the previous Examples as to initial reduction of surface contamination and reduction of bacterial growth during storage.

EXAMPLE V

An inoculated study was conducted, whereby fresh mutton legs were dipped into a bath of Pseudamonas sp. culture resulting in an average count of 460,000 per sq. inch prior to treatment. The legs were treated with a 1.5% acetic acid solution for 10 seconds at varying temperatures. The treated legs were packaged in cryovac bags closed under vacuum and stored at 31°F. for 21 days. The following table presents the data obtained.

TABLE IX

| Leg No. | Temp °F. | Count/Sq. In. After Treatment | % Reduction In Microorganisms | Count/Sq. In. 21 Days |
|---|---|---|---|---|
| 1 | 135 | 150,000 | 67.4 | 40,000 |
| 2 | 150 | 28,000 | 93.9 | 7,000 |
| 3 | 165 | 9,000 | 98.1 | 20,000 |
| 4 | 180 | 600 | 99.8 | 3,000 |

Obviously, many modifications and variations of the invention may be made without departing from the spirit and scope thereof, and therefore, only those limitations should be imposed as are indicated in the appended claims.

We claim:

1. A process for treating meat to destroy substantial amounts of psychrotrophic spoilage bacteria carried on the surfaces thereof, said process comprising contacting all surfaces of said meat with an aqueous solution of acetic acid having an acid concentration of from about 1–2.5% by weight, and having a temperature of from about 140°F. to 180°F. for a time period of from about 5 to 60 seconds.

2. The process of claim 1 wherein the acid solution has a concentration of about 1 ½% and a temperature of about 160°F., and is applied to meat-cuts as a spray for about 10 seconds.

3. The process of claim 1 wherein the meat is a cooked, table-ready meat product.

4. The process of claim 1 wherein the meat is subsequently packaged in low oxygen permeability film and is thereafter refrigerated at from about 30°F. to 40°F.

5. The process of claim 1 wherein the meat is treated within a chamber in which the temperature is maintained at from about 140°F. to 180°F.

6. The process of claim 5 wherein the acetic acid solution is applied as a spray to all surfaces of meat-cuts at a temperature of from about 150°F. to 170°F. for from about 5–30 seconds.

7. The process of claim 6 wherein the meat-cuts are fresh meat selected from the group consisting of beef, pork, poultry, lamb and veal.

8. The process of claim 7 wherein the meat-cuts are packaged in low oxygen permeability film after spray treatment and are then refrigerated at from about 30°F. to 40°F.

9. The process of claim 8 wherein the meat-cut is a sub-primal cut.

10. The process of claim 8 wherein the meat-cut is a retail cut.

* * * * *

UNITED STATES PATENT OFFICE
CERTIFICATE OF CORRECTION

PATENT NO. : 3,934,044

DATED : January 20, 1976

INVENTOR(S) : Wayne A. Busch, Robert E. Taylor and Robert B. Tompkin

It is certified that error appears in the above-identified patent and that said Letters Patent are hereby corrected as shown below:

The patent should show on its face that it is assigned to Swift & Company of Chicago, Illinois.

*Signed and Sealed this*

*twenty-ninth* Day of *June 1976*

[SEAL]

Attest:

RUTH C. MASON
*Attesting Officer*

C. MARSHALL DANN
*Commissioner of Patents and Trademarks*